US011568252B2

(12) United States Patent
Qin et al.

(10) Patent No.: US 11,568,252 B2
(45) Date of Patent: Jan. 31, 2023

(54) VARIABLE INPUT SIZE TECHNIQUES FOR NEURAL NETWORKS

(71) Applicant: Alibaba Group Holding Limited, Grand Cayman (KY)

(72) Inventors: Minghai Qin, Sunnyvale, CA (US); Yen-Kuang Chen, Palo Alto, CA (US); Zhenzhen Wang, Sunnuyvale, CA (US); Fei Sun, San Jose, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 270 days.

(21) Appl. No.: 16/915,845

(22) Filed: Jun. 29, 2020

(65) Prior Publication Data

US 2021/0406676 A1 Dec. 30, 2021

(51) Int. Cl.
*G06N 3/08* (2006.01)
*G06F 7/58* (2006.01)
*G06K 9/62* (2022.01)

(52) U.S. Cl.
CPC ............ *G06N 3/08* (2013.01); *G06F 7/58* (2013.01); *G06K 9/6256* (2013.01); *G06K 9/6268* (2013.01)

(58) Field of Classification Search
CPC .......... G06N 3/08; G06F 7/58; G06K 9/6256; G06K 9/6268; G06V 10/454; G06V 10/82
USPC ......................................................... 706/25
See application file for complete search history.

(56) References Cited

U.S. PATENT DOCUMENTS

| 11,334,789 | B2* | 5/2022 | Towal ................. G06K 9/6267 |
| 2016/0132750 | A1* | 5/2016 | Yang .................... G06K 9/6226 382/197 |
| 2019/0042918 | A1* | 2/2019 | Meyer .................... G06N 20/00 |
| 2021/0034971 | A1* | 2/2021 | Han ....................... G06N 3/08 |
| 2021/0089888 | A1* | 3/2021 | Gope ..................... G06N 3/08 |
| 2021/0097360 | A1 | 4/2021 | Sato et al. |
| 2021/0097366 | A1 | 4/2021 | Wagner et al. |
| 2021/0097368 | A1 | 4/2021 | Lin et al. |
| 2021/0097381 | A1 | 4/2021 | Daykin et al. |
| 2021/0097383 | A1 | 4/2021 | Kaur et al. |
| 2021/0097396 | A1 | 4/2021 | Vivekraja et al. |
| 2021/0097397 | A1 | 4/2021 | Sakai |
| 2021/0097398 | A1 | 4/2021 | Snell |
| 2021/0097403 | A1 | 4/2021 | Park et al. |
| 2021/0097645 | A1 | 4/2021 | Navarrete Michelini et al. |
| 2021/0097647 | A1* | 4/2021 | Chen .................... G06V 10/454 |
| 2021/0097649 | A1 | 4/2021 | Liu et al. |
| 2021/0097656 | A1 | 4/2021 | Kondo |
| 2021/0097691 | A1 | 4/2021 | Liu |
| 2021/0098300 | A1 | 4/2021 | Kusunoki et al. |
| 2021/0098477 | A1 | 4/2021 | Tran et al. |
| 2021/0099310 | A1 | 4/2021 | Fang et al. |
| 2021/0099710 | A1 | 4/2021 | Salehifar et al. |
| 2021/0133976 | A1* | 5/2021 | Carmi .................. G06T 7/0016 |
| 2021/0174214 | A1* | 6/2021 | Venkatesan ............ G06N 3/04 |
| 2021/0374524 | A1* | 12/2021 | Feng .................... G06K 9/6252 |

* cited by examiner

Primary Examiner — Juan A Torres

(57) ABSTRACT

A neural network, trained on a plurality of random size data samples, can receive a plurality of inference data samples including samples of different sizes. The neural network can generate feature maps of the plurality of inference data samples. Pooling can be utilized to generate feature maps having a fixed size. The fixed size feature maps can be utilized to generate an indication of a class for each of the plurality of inference data samples.

19 Claims, 7 Drawing Sheets

VARIABLE INPUT SIZE TECHNIQUES FOR NEURAL NETWORKS

BACKGROUND OF THE INVENTION

A common artificial intelligence (AI) application includes image recognition. A neural network is commonly used to determine a probability that an input image belongs to a particular class, or includes one or more portions that belong to one or more classes. For example, a neural network can determine that there is a 90% probability that a given image includes a cat. Referring now to FIG. 1, a neural network system according to the conventional art is shown. The conventional neural network system 100 is configured to receive input data samples of a predetermined size 110. For example, the neural network system 100 can be configured to receive image data samples of 224×224 pixels. The accuracy of the output 120 of neural network system 100 can be increased by processing input data samples of a predetermined size. If the input data samples have a variable size, the input data samples are typically resized to a predetermined size. For example, a data resized engine 210 can be configured to receive input data samples of variable size 220 and generate corresponding input data samples of a predetermined size 230, as illustrated in FIG. 2. The neural network system 240 can then generate an output 250 based on the input data samples of the predetermined size 230. However, the resizing of the input data adds to the computational workload. Therefore, there is a continuing need for improved neural network systems that can achieve improved accuracy for input data of variable sizes.

SUMMARY OF THE INVENTION

The present technology may best be understood by referring to the following description and accompanying drawings that are used to illustrate embodiments of the present technology directed toward variable input size techniques for neural networks.

In one embodiment, a neural network system, computing unit or processor can include a random resizing module, a neural network, a pooling module and a classification module. The random resizing module can be configured to receive a plurality of training data samples of input data and generate a plurality of random size training data samples. The neural network can be configured to receive the plurality of random size training data samples, generate feature maps having a variable size for each of the plurality of random size training data samples, and train one or more parameters of the neural network based on the plurality of random size training data samples. The pooling module can be configured to receive the variable size feature maps for each of the plurality of random size training data samples, and generate corresponding feature maps having a fixed size for each of the plurality of random size training data samples. The classification module can be configured to receive the fixed size feature maps for each of the plurality of random size training data sample, and generate an indication of a class for each of the plurality of training data samples.

The neural network can be further configured to receive one or more variable size inference data samples of the input data, and generate feature maps for each of the one or more inference data samples having variable size. The pooling module can be further configured to receive the variable size feature maps for each of the one or more inference data samples, and generate corresponding feature maps having the fixed size for each of the one or more inference data samples. The classification module can be further configured to receive the fixed size feature maps for each of the one or more inference data samples, and generate an indication of a class for each of the one or more inference data samples.

The neural network system, computing unit or processor can further include an input data size controller and a neural network resizer. The input data size controller can be configured to receive the plurality of random size training data samples and the one or more variable size inference data samples, and determine that a size of the plurality of random size training data samples and the one or more variable size inference data samples is within a specified range. The neural network resizer can be configured to resize given ones of the plurality of random size training data samples and the one or more variable size inference data samples to within the specified range when the given ones of the plurality of random size training data samples and the one or more variable size inference data samples are not within the specified range.

In another embodiment, a neural network processing method can include receiving a plurality of training data samples, randomly resizing the plurality of training data samples, and training a neural network based on the plurality of random size training data samples.

In yet another embodiment, a neural network processing method can include receiving a plurality of inference data samples including samples of different sizes. Feature maps of the plurality of inference data samples can be generated using a neural network trained on a plurality of random size training data samples. The feature maps of the plurality inference data samples can be average pooled to generate feature maps having a fixed size. The fixed size feature maps can be utilized to generate an indication of a class for each of the plurality of inference data samples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology am illustrated by way of example and not by way of limitation, in the figures of the accompanying drawings and in which like reference numerals refer to similar elements and in which.

DETAILED DESCRIPTION OF THE INVENTION

Figure 1:
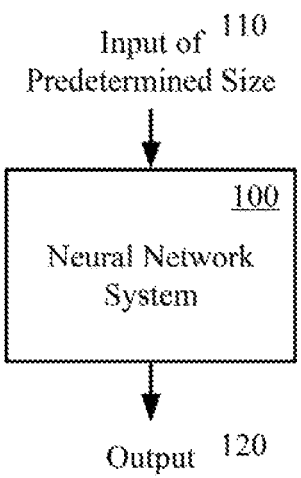
FIG. 1 shows a neural network system according to the conventional art.
Figure 2:
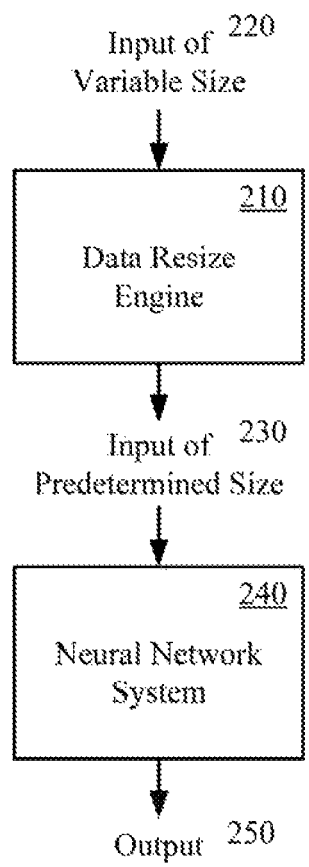
FIG. 2 shows another neural network system according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 3:
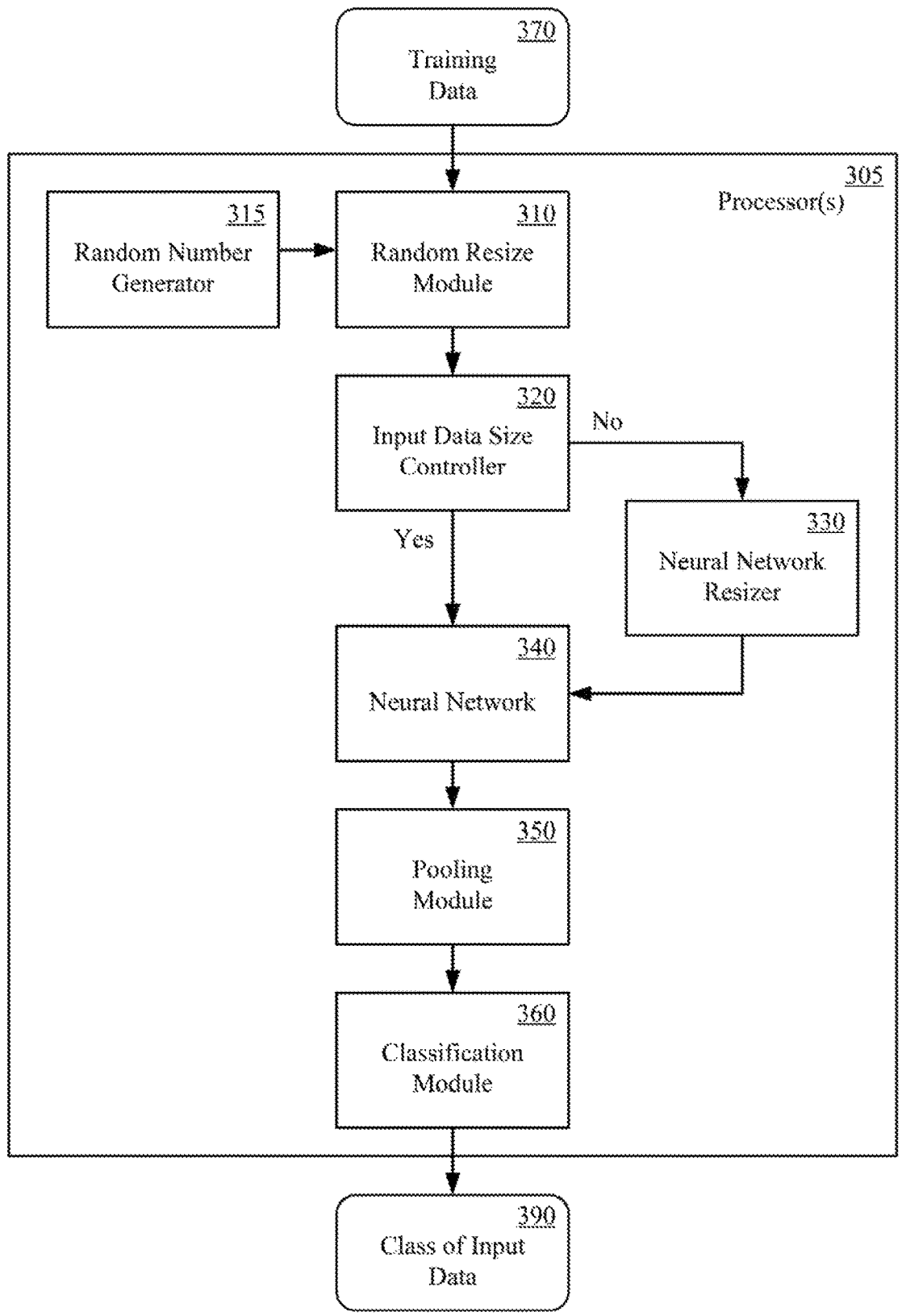
FIG. 3 shows a neural network system in a training mode, in accordance with aspects of the present technology.

Referring now to FIG. 3, a neural network system in a training mode, in accordance with aspects of the present technology, is shown. The neural network system 300 can include a random resizing module 310, an input data size controller 320, a neural network resizer 330, a neural network 340, a pooling module 350, and a classification module 360. The neural network system 300 can also optionally include a random number generator 315. In one implementation, the neural network system 300 can be implemented as computing device-executable instructions (e.g., computer program) that are stored in computing device-readable media (e.g., computer memory) and executed by a computing device (e.g., processor). In another implementation, the neural network system 300 can be implemented in hardware such as, but not limited to, a finite state machine, an application specific integrated circuit, a field programmable gate array or the like. In yet other implementations, the neural network system 300 can be implemented in a combination of hardware and software.

In the training mode, the random resize module 310 can be configured to receive a plurality of training data samples 370 of input data. In one implementation, the training data samples 370 can comprise a plurality of images. The plurality of training data samples 370 can be either of a fixed size or one or more variable sizes. The random resize module 310 can generate a plurality of random size training data samples from the received training data samples 370. In one implementation, the random resizing module 310 can generate the plurality of random size training data based on corresponding random numbers. In one implementation, the random numbers can be generated by the optional random number generator 315 for each of the plurality of training data samples 370. In another implementation, the random numbers can be generated by the random number generator 315 for each mini-batch of training data samples 370. In such an implementation, the training data samples within a mini-batch can have the same size, but the training data samples in different mini-batches will have different sizes based on the corresponding random number. In one implementation, the random number generator 315 can be external to the random resizing module 310. In another implementation, the random number generator 315 can be internal to the random resizing module 310. In one implementation, the random number generator 315 can generate numbers within a predetermined size range. For example, the random number generator 315 can generate a random number between 64 and 516. The random resizer module 310 can deterministically resize the training data samples to a size corresponding to the random generated number. For example, if the random number for a given training data sample is 224, the random resizer module 310 can resize the training data sample to a size of 224×224 pixels. If the random number for a given training data sample is 448, the random resizer module 310 can resize the training data sample to a size of 448×448 pixels.

The input data size controller 320 can be configured to receive the plurality of random size training data samples, and determine whether the size of the training data samples is within a specified range. If the size of one or more training data samples 370 are not within the specified range, the neural network resizer 330 can be configured to resize the given ones of the plurality of random size training data samples to within the specified range. For example, the specified range can be from 224 to 448. If the size of a given training data sample is greater than the upper limit of 448×448 pixels, the given training data sample can be down-sampled one or more times until the resized given data sample is within the specified range. If the size of a given training data sample is less than the lower limit of 224×224 pixels, the given training data sample can be up-sampled one or more times until the resized given data sample is within the specified range. If the plurality of training data samples include one or more mini-batches, the input data size controller 320 can determine the size of the training data samples for each mini-batch, and the neural network resizer 330 can resize each mini-batch of random size training data samples that is not within a specified range.

The neural network 340 can be configured to receive the plurality of random size training data samples within the specified range and generate feature maps having a variable size for each of the plurality of random size training data samples. In the training mode, the neural network 340 can be trained based on the plurality of random size training data samples. For example, training the neural network 340 can include adjusting one or more parameters of the neural network 340 based on the plurality of random size training data samples. In one implementation, the one or more parameters can comprise one or more weights of the neural network 340. In one implementation, the neural network 340 can be trained by generating reconstructed training data samples from the generated feature maps. The one or more weights of the neural network 340 can then be adjusted based on a difference between the training data samples and the corresponding reconstructed training data samples.

The pooling module 350 can be configured to receive the variable size feature maps for each of the plurality of random size training data samples, and generate corresponding feature maps having a fixed size for each of the plurality of random size training data samples. In one implementation, the pooling module 350 can be an average pooling module, a max pooling module, or the like. The classification module 360 can be configured to receive the fixed size feature maps, and generate an indication of a class 390 for each of the plurality of training data samples.

Figure 4:
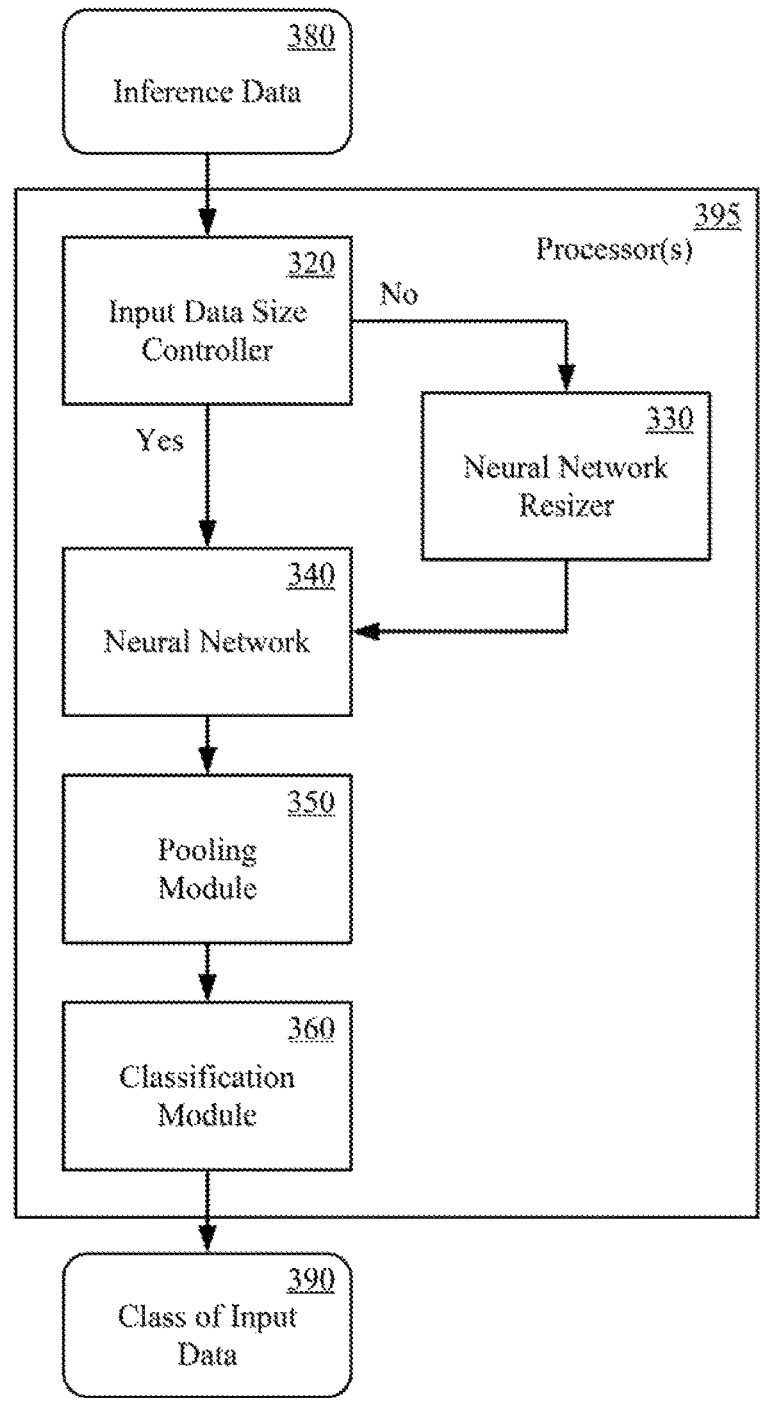
FIG. 4 shows a neural network system in an inference mode, in accordance with aspects of the present technology.

Referring now to FIG. 4, the neural network system in an inference mode, in accordance with aspects of the present technology, is shown. In the inference mode, the input data size controller 320 can be configured to receive one or more variable size inference data samples 380 of the input data. The input data size controller 320 can determine whether the size of the inference data samples 380 is within a specified range. If the size of one or more inference data samples 380 are not within the specified range, the neural network resizer 330 can be configured to resize the given ones of the plurality of inference data samples to within the specified range. For example, if the size of a given inference data sample is greater than an upper limit of the specified range, the given inference data sample can be down-sampled one or more times until the resized given data sample is within the specified range. If the size of a given inference data sample is less than a lower limit of the specified range, the given inference data sample can be up-sampled one or more times until the resized given data sample is within the specified range.

The neural network 340 can be configured to receive the plurality of variable size inference data samples within the specified range and generate feature maps having a variable size for each of the plurality of variable size inference data samples. In one implementation, the neural network 340 can be a convolution neural network, a deep neural network or the like configured to perform an applicable neural network application. For example, the neural network 340 can be a deep neural network configured for image recognition.

The pooling module 350 can be configured to receive the feature maps having a variable size for each of the plurality of variable size inference data samples, and generate corresponding feature maps having a fixed size for each of the plurality of variable size inference data samples. The classification module 360 can be configured to receive the feature maps having a fixed size, and generate an indication of a class 390 for each of the plurality of training data samples.

It is to be appreciated that the neural network system 300 can be trained on one or more processors 305, and a different set of one or more processors 395 can be utilized to run the neural network system 300 in the inference mode. In other implementations, the neural network system 300 can be run on the same set of one or more processors in both the training mode and the inference mode. It is also to be appreciated that in applications where the input data samples are within a specified range, the input data size controller 320 and the neural network resizer 330 may not be needed.

Figure 5:
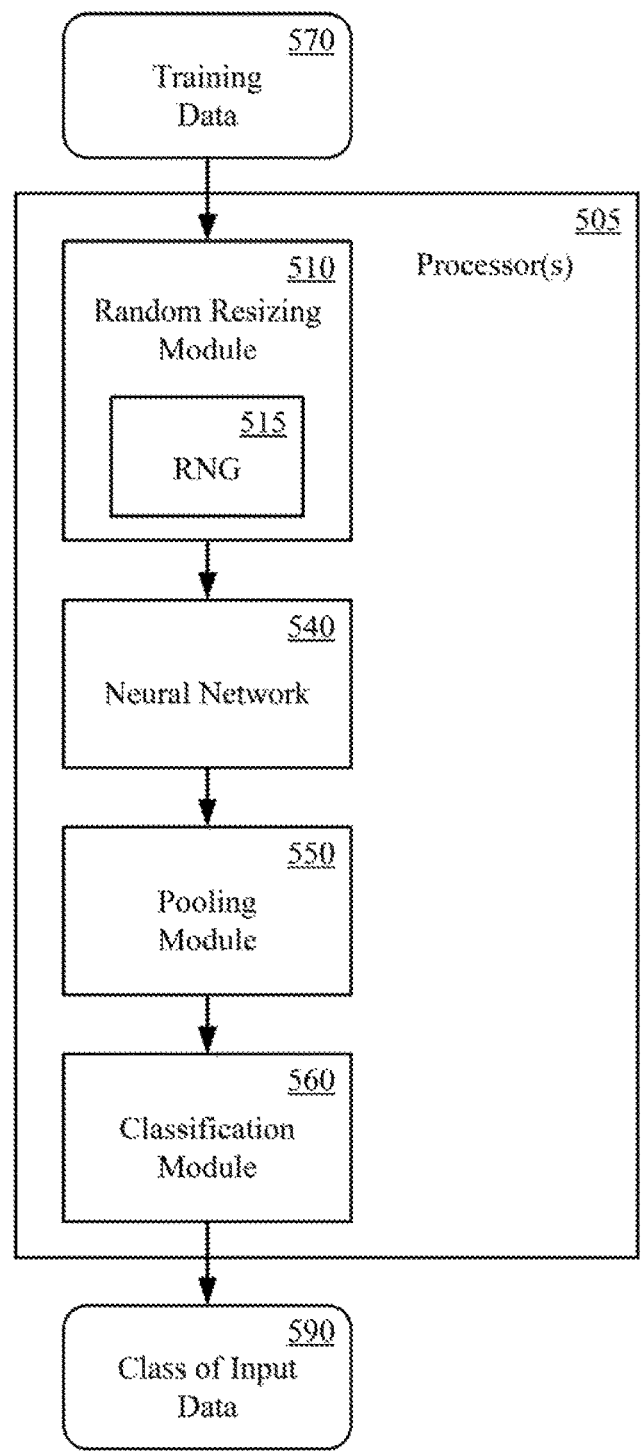
FIG. 5 shows a neural network system in a training mode, in accordance with aspects of the present technology.

Referring now to FIG. 5, a neural network system in a training mode, in accordance with aspects of the present technology, is shown. The neural network system 500 can include a random resizing module 510, a neural network 540, a pooling module 550, and a classification module 560. The neural network system 300 can also optionally include a random number generator 515. In one implementation, the neural network system 500 can be implemented as computing device-executable instructions (e.g., computer program) that a restored in computing device-readable media (e.g., computer memory) and executed by a computing device (e.g., processor). In another implementation, the neural network system 500 can be implemented in hardware such as, but not limited to, a finite state machine, an application specific integrated circuit, a field programmable gate array or the like. In yet other implementations, the neural network system 500 can be implemented in a combination of hardware and software.

In a training mode, the random resize module 510 can be configured to receive a plurality of training data samples 570 of input data. In one implementation, the training data samples 570 can comprise a plurality of images. The plurality of training data samples 570 can be either of a fixed size or one or more variable sizes. The random resize module 510 can generate a plurality of random size training data samples from the received training data samples 570. In one implementation, the random resizing module 510 can generate the plurality of random size training data based on corresponding random numbers. In one implementation, the random numbers can be generated by a random number generator 515 for each of the plurality of training data samples 570. In another implementation, the random numbers can be generated by the random number generator 515 for each mini-batch of training data samples 570. In one implementation, the random number generator 515 can be external to the random resizing module 510. In another implementation, the random number generator 515 can be internal to the random resizing module 510.

The neural network 540 can be configured to receive the plurality of random size training data samples and generate feature maps having a variable size for each of the plurality of random size training data samples. In the training mode, the neural network 540 can be trained based on the plurality of random size training data samples. For example, training the neural network 540 can include adjusting one or more parameters of the neural network 540 based on the plurality of random size training data samples. In one implementation, the one or more parameters can comprise one or more weights of the neural network 540. In one implementation, the neural network 540 can be trained by generating reconstructed training data samples from the generated feature maps. The one or more weights of the neural network 540 can then be adjusted based on a difference between the training data samples and the corresponding reconstructed training data samples.

The pooling module 550 can be configured to receive the variable size feature maps for each of the plurality of random size training data samples, and generate corresponding feature maps having a fixed size for each of the plurality of random size training data samples. In one implementation, the pooling module 550 can be an average pooling module, a max pooling module, or the like. The classification module 560 can be configured to receive the fixed size feature maps, and generate an indication of a class 590 for each of the plurality of training data samples.

Figure 6:
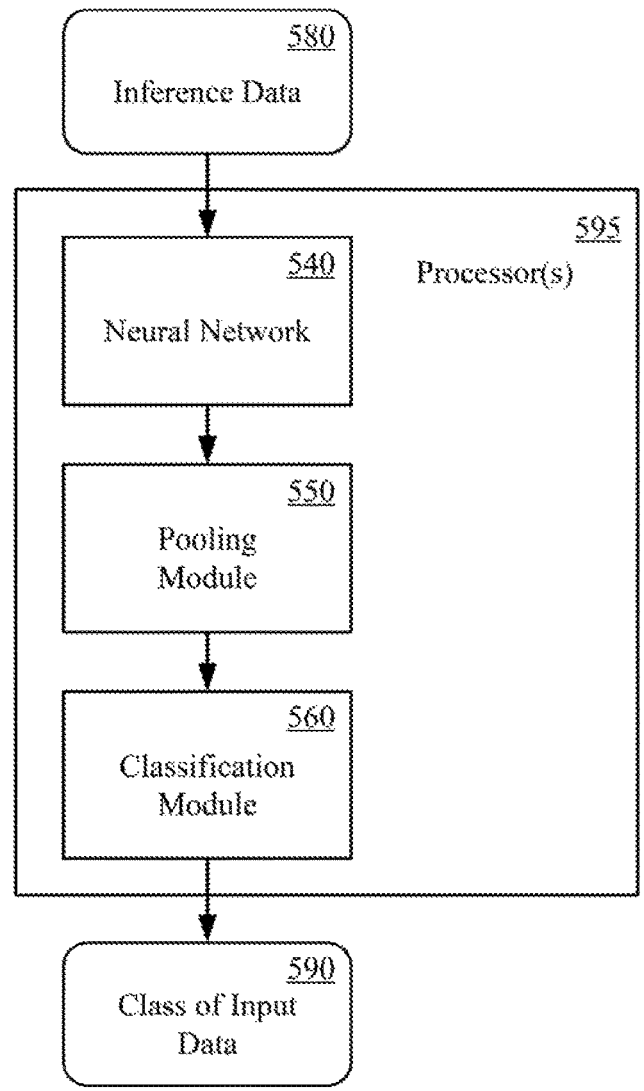
FIG. 6 shows a neural network system in an inference mode, in accordance with aspects of the present technology.

Referring now to FIG. 6, the neural network system in an inference mode, in accordance with aspects of the present technology, is shown. In the inference mode, the neural network 540 can be configured to receive one or more variable size inference data samples 580 of the input data. The neural network 540 can generate feature maps having a variable size for each of the plurality of variable size inference data samples. In one implementation, the neural network 540 can be a convolution neural network, a deep neural network or the like configured to perform an applicable neural network application. For example, the neural network 540 can be a deep neural network configured for image recognition.

The pooling module 550 can be configured to receive the variable size feature maps, and generate corresponding feature maps having a fixed size for each of the plurality of variable size inference data samples. The classification module 560 can be configured to receive the fixed size feature maps, and generate an indication of a class 590 for each of the plurality of training data samples.

Again, it is to be appreciated that the neural network system 500 can be trained on one or more processors 505, and a different set of one or more processors 595 can be utilized to run the neural network system 300 in the inference mode. In other implementations, the neural network system 500 can be run on the same set of one or more processors in both the training mode and the inference mode.

Figure 7:
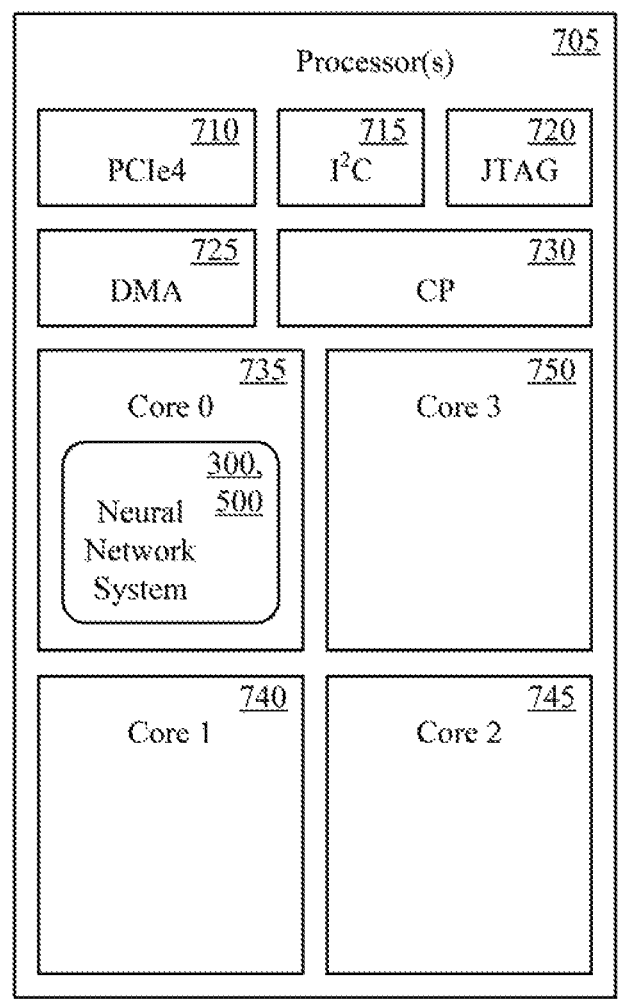
FIG. 7 shows an exemplary processor including a neural network system, in accordance with aspects of the present technology.

Referring now to FIG. 7 an exemplary processor including a neural network system, in accordance with aspects of the present technology, is shown. The processor 705 can include one or more communication interfaces, such as peripheral component interface (PCIe4) 710 and inter-integrated circuit (I²C) interface 715, an on-chip circuit tester, such as a joint test action group (JTAG) engine 720, a direct memory access engine 725, a command processor (CP) 730, and one or more cores 735-750. The one or more cores 735-750 can be coupled in a direction ring bus configuration.

The one or more cores 735-750 can execute one or more sets of computing device executable instructions to perform one or more functions including, but not limited to, neural network systems 300,500 as described above with reference to FIGS. 3 through 6. The one or more functions can be performed on an individual core 735-750, can be distributed across a plurality of cores 735-750, can be performed along with one or more other functions on one or more cores, and or the like. In addition, the exemplary processor 705 can perform one or more functions of the neural network system in accordance with aspects of the present technology in a training mode, and inference mode, or both the training and inference modes.

The processor 705 can be a central processing unit (CPU), a graphics processing unit (GPU), a neural processing unit (NPU), a vector processor, a memory processing unit, or the like, or combinations thereof. In one implementation, one or more processors 705 can be implemented in a computing devices such as, but not limited to, a cloud computing platform, an edge computing device, a server, a workstation, a personal computer (PCs), or the like.

Figure 8:
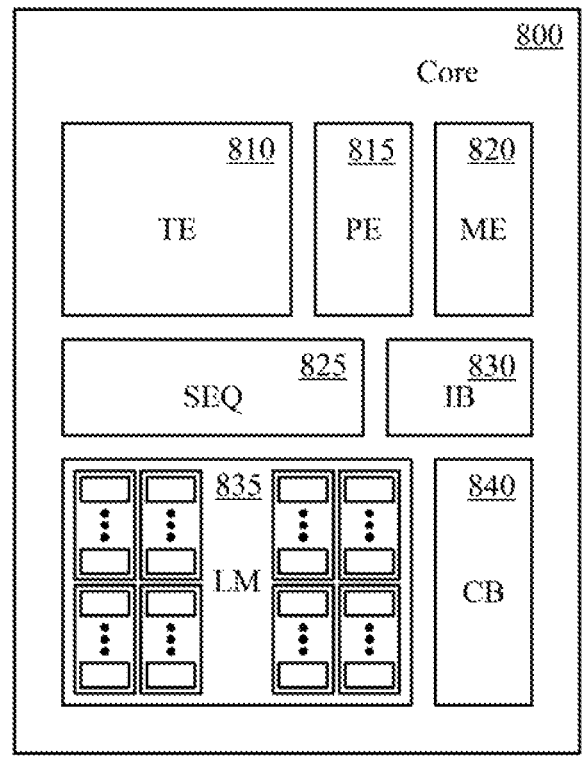
FIG. 8 shows an exemplary processing core, in accordance with aspects of the present technology.

Referring now to FIG. 8, an exemplary processing core, in accordance with aspects of the present technology, is shown. The processing core 800 can include a tensor engine (TE) 810, a pooling engine (PE) 815, a memory copy engine (ME) 820, a sequencer (SEQ) 825, an instructions buffer (IB) 830, a local memory (LM) 835, and a constant buffer (CB) 840. The local memory 835 can be pre-installed with model weights and can store in-use activations on-the-fly. The constant buffer 840 can store constants for batch normalization, quantization and the like. The tensor engine 810 can be utilized to accelerate fused convolution and or matrix multiplication. The pooling engine 815 can support pooling, interpolation, region-of-interest and the like operations. The memory copy engine 820 can be configured for inter- and or intra-core data copy, matrix transposition and the like. The tensor engine 810, pooling engine 815 and memory copy engine 820 can run in parallel. The sequencer 825 can orchestrate the operation of the tensor engine 810, the pooling engine 815, the memory copy engine 820, the local memory 835, and the constant buffer 840 according to instructions from the instruction buffer 830. The processing unit core 800 can provide a neural network system on random sized input data. A detailed description of the exemplary processing unit core 800 is not necessary to an understanding of aspects of the present technology, and therefore will not be described further herein.

Although aspects of the present technology have been explained with reference to a neural network configured for image recognition, aspects of the present technology can be readily applied to a number of other neural network applications including but not limited to medical diagnosis, handwriting recognition and the like. Aspects of the present technology advantageously enable use of neural network on input data samples having various input sizes, wherein the neural network has been trained on random sized input data. Training the neural network using random sized input data samples can advantageously achieve accuracy rates substantially similar to neural networks that are trained on fixed size data samples and inference on the same fixed size data samples. For example, in the conventional art, a ResNet-50 neural network trained using training data samples having a 224×224 pixel size from an ImageNet dataset can achieve an image recognition accuracy of approximately 76% for inference data samples having the same 224×224 pixel size. In the conventional art, the image recognition accuracy for inference data samples having variable size drops to approximately 72% for the same ResNet-50 neural network trained using training data samples having a 224×224 pixel size from the ImageNet dataset. In contrast, aspects of the present technology can achieve an image recognition accuracy for inference data samples having variable size of approximately 77% when the same ResNet-50 neural network is trained using data samples from the ImageNet dataset with random image sizes. Aspects of the present technology that enable the use of neural networks on input data samples having various input sizes can also advantageously eliminate the need to skip resizing of the input data, and corresponding reduce the computational workload.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A processor comprising:
a random resizing module configured to receive a plurality of training data samples of input data and generate a plurality of random size training data samples;
a neural network configured to receive the plurality of random size training data samples, generate feature maps having a variable size for each of the plurality of random size training data samples, and train one or more parameters of the neural network based on the plurality of random size training data samples;
a pooling module configured to receive the variable size feature maps for each of the plurality of random size training data samples, and generate corresponding feature maps having a fixed size for each of the plurality of random size training data samples; and
a classification module configured to receive the fixed size feature maps for each of the plurality of random size training data sample, and generate an indication of a class for each of the plurality of training data samples.

2. The processor of claim 1, further comprising:
an input data size controller configured to receive the plurality of random size training data samples and determine that a size of the plurality of random size training data samples is within a specified range; and
a neural network resizer configured to resize given ones of the plurality of random size training data samples to within the specified range when the given ones of the plurality of random size training data samples are not within the specified range.

3. The processor of claim 2, wherein:
the plurality of random size training data samples include one or more mini-batches of random size training data samples;
the input data size controller is configured to determine the size of each mini-batch of random size training data samples; and
the neural network resizer is configured to resize each mini-batch of random size training data samples.

4. The processor of claim 1, wherein the input data comprise images.

5. The processor of claim 1, wherein the random resizing module is further configured to generate the plurality of random size training data based on corresponding random numbers.

6. The processor of claim 5, further comprising a random number generator configured to generate the corresponding random numbers.

7. The processor of claim 1, wherein the one or more parameters of the neural network comprise a plurality of weights.

8. A processor comprising:
a neural network configured to receive one or more variable size inference data samples of the input data, and generate feature maps for each of the one or more inference data samples having variable size;
a pooling module configured to receive one or more variable size inference data samples of the input data, and generate feature maps having a fixed size for each of the one or more inference data samples having variable size;
a classification module configured to receive the fixed size feature maps for each of the one or more inference data samples, and generate an indication of a class for each of the one or more inference data samples.

9. The processor of claim 8, further comprising:
an input data size controller configured to receive the one or more variable size inference data samples and determine that a size of the one or more variable size inference data samples is within a specified range; and
a neural network resizer configured to resize given ones of the one or more variable size inference data samples to within the specified range when the one or more variable size inference data samples are not within the specified range.

10. The processor of claim 9, wherein:
the one or more variable size inference data samples include one or more mini-batches of variable size inference data samples;
the input data size controller is configured to determine the size of each mini-batch of variable size inference data samples; and
the neural network resizer is configured to resize each mini-batch of variable size inference data samples.

11. A method comprising:
receiving a plurality of training data samples;
randomly resizing the plurality of training data samples;
generating feature maps having a variable size using a neural network for each of the plurality of random sized training data samples;
training a neural network based on the plurality of random size training data samples;
generating feature maps having a fixed size for each of the plurality of random size training data samples; and
generating an indication of a class for each of the plurality of training data samples based on the fixed size feature maps.

12. The method according to claim 11, wherein the training data samples comprise images.

13. The method according to claim 11, wherein the plurality of training data samples are randomly resized based on random numbers.

14. The method according to claim 11, further comprising:
determining that a size of the plurality of training data samples are within a specified range; and resizing given ones of the plurality of training data samples to within the specified range when the given ones of the plurality of training data sample are not within the specified range.

15. The method according to claim 11, wherein training the neural network includes adjusting one or more weights of the neural network based on the randomly resized plurality of training data samples.

16. A method comprising:

receiving a plurality of inference data samples including samples of different sizes;

generating feature maps having variable size of the plurality of inference data samples using a neural network trained on a plurality of random size training data samples;

pooling the feature maps having variable size of the plurality inference data samples to generate feature maps having a fixed size; and classifying the fixed size feature maps to generate an indication of a class for each of the plurality of inference data samples.

17. The method according to claim 16, wherein the inference data samples comprise images.

18. The method according to claim 16, further comprising:

determining a size of each of the plurality of inference data samples; and resizing given ones of the plurality of inference data samples to within a predetermined size range.

19. The method according to claim 16, further comprising:

determine a size of each of a plurality of mini-batches of the plurality of inference data samples; and resizing the inference data samples of given ones of the plurality of mini-batches to within a predetermined size range.

* * * * *